United States Patent [19]

Netiv

[11] Patent Number: 5,809,138
[45] Date of Patent: Sep. 15, 1998

[54] METHOD FOR PROTECTING STORAGE MEDIA AGAINST COMPUTER VIRUS INFECTION

[75] Inventor: Zvi Netiv, Givat-Shmuel, Israel

[73] Assignee: Netz Computing Ltd., Givat-Shmuel, Israel

[21] Appl. No.: 421,093

[22] Filed: Apr. 13, 1995

Related U.S. Application Data

[63] Continuation-in-part of Ser. No. 279,726, Jul. 25, 1994, abandoned.
[51] Int. Cl.$^6$ .................................................. H04L 9/00
[52] U.S. Cl. ................................ 380/4; 380/49; 380/50; 395/186
[58] Field of Search .................................. 380/4, 49, 50, 380/59; 395/700, 183.01, 183.03, 183.06, 183.07, 183.08, 183.09, 183.12, 183.13, 183.14, 183.15, 184.01, 185.01, 185.02, 185.04, 186, 187.01

[56] References Cited

U.S. PATENT DOCUMENTS 5,361,359  11/1994  Tajalli et al. .......................... 395/700
5,367,682  11/1994  Chang ...................................... 395/700

OTHER PUBLICATIONS

P. 361 of vol. 12, No. 13 of "PC Magazine" (Jul. 1993 Issue).

*Primary Examiner*—Bernarr E. Gregory
*Attorney, Agent, or Firm*—Sprung Kramer Schaefer & Briscoe

[57] ABSTRACT

A method of protecting computer files that are pre-stored on a storage medium such as a floppy-disk, against a computer virus infection. The method includes determining a free-space value (e.g., number of bytes) not occupied on the storage medium by programs or data files. An existing file on the medium is selected and opened and a file pointer for the location of the selected file is obtained, for example, by referring to a file allocation table (FAT) on the storage medium. The value of the file pointer with respect to the location of the end of the selected file is offset by an amount corresponding to the determined free space on the storage medium, and the pointer value with the offset is re-written in the FAT. Accordingly, the free space on the storage medium becomes entirely associated with the selected file or files, leaving no apparent room on the medium for storing a computer virus.

27 Claims, 2 Drawing Sheets

METHOD FOR PROTECTING STORAGE MEDIA AGAINST COMPUTER VIRUS INFECTION

This application is a continuation-in-part of U.S. application Ser. No. 08/279,726, filed Jul. 25, 1994, now abandoned.

FIELD AND BACKGROUND OF THE INVENTION

The present invention is in the field of protection against infection by computer viruses. A computer virus is a parasitic computer executable code, that is capable of replicating and attaching itself to programs by writing itself on the program's storage medium. As of today, there are about 3,000 to 5,000 known viruses and all of them either attach themselves to files or to system booting programs of the hard disk or of a floppy diskette. Of the known viruses, the great majority are file infectors (they attach themselves to program files) and just one to two hundred are of the boot infector type. Thus, the major problem is to protect against file infecting viruses.

A program may become infected by being exposed to an infected environment (a virus is present in the computer's memory), while attempting to execute the program. What actually happens is that the virus code writes a copy thereof onto the storage medium, which is then appended to the host program code.

The commonly accepted definition of a computer virus is: "a computer code, having the capability of inheriting its own replicating nature". This definition of computer viruses had to be changed over the years to accommodate for new types of viruses. The definition above covers existing virus categories: boot, file, multipartite, companion and cluster viruses. The main feature that discriminates a virus from other programs is its replicating nature. The broader definition was needed because of the advent of "mutation engines" that cause virus code to differ totally from one copy to another, whilst retaining its replicating nature.

There are other forms of rogue codes that are sometimes referred to as viruses, yet their correct definition is Trojan Horse. The difference is that a Trojan horse substitutes the original function of the trojanized program by its own function, while a virus will append itself to a program, without modifying the program's original function. The reason that viruses do not affect the functionality of their host program is that in order to replicate efficiently, a virus program must conceal its own presence, otherwise, the user of the program may notice that something is wrong, and take actions that will stop the further spreading of the virus.

Yet there is a clear correlation between the destructiveness of a virus (or Trojan horse) and whether it will widely spread. From the 5000+ known viruses there are less than 500 that are widely circulated, yet there is not a single Trojan horse among the hundred most common ones.

It is accordingly appreciated that the vast majority of the existing computer viruses do not overwrite their host program.

Computer viruses do not usually affect data, they affect executable programs. Since the primary purpose of a virus writer is to make his virus spread, then there is no "useful" purpose from the standpoint of the virus writer to cause it to affect data. There are certain data files that may appear to have the structure of an executable program, and there are viruses that will affect such programs, as if they were real executable programs.

There will now be described a typical series of steps performed by a computer virus that is resident in the computer's memory for effectively infecting a candidate program.

Thus, at the onset, the candidate program will be inspected in order to determine whether it has already been infected. If in the affirmative, the re-infection procedure will be aborted and the virus will wait for the next candidate program. If, on the other hand, the candidate program has not yet been infected, then the program's suitability for infection will be tested, and if the latter test is not met, then the infection process will abort. The order in which the "suitability" and "if already infected" steps are performed is insignificant.

Having determined the suitability of the candidate program, the virus code will then be added to the program, usually by appending the virus code to the end of the file. A few viruses do prepend their code to the file instead of appending. Very few viruses do both prepend part of the code and append the rest. Next, the outcome of the operation will be tested, i.e. the virus will attempt to append its code to the file, usually by using standard DOS® functions such as "open file", "move file pointer", "write predetermined number of bytes". The success or failure of each step is reported by DOS® and can be tested. If unsuccessful, then the process will be aborted. There are few viruses that will proceed to the next step, in spite of a failure in appending their code.

At this stage the host program has not yet been really infected. There is still need to tie-in the virus code to the host program, in a way that the virus code is executed first, and then control is returned to the original program. The tieing-in of the virus to the host is realized by modifying the entry point of the program to point to the virus code, and storing the original entry point of the program in the virus data.

There are several ways to protect computer programs from virus infection. A simple and passive protection method is by using "read-only" media such as CD-ROM® (Compact Disk—Read Only Memory), or floppy disks that are write-protected. Many computer programs such as the circulated MS-DOS, Windows operating systems, are distributed on write-disabled floppy disks.

More popular are anti-viral (hereinafter "AV") software utilities. Such AV utilities have been incorporated into popular operating systems like DOS®. Two such examples are MSAV® (Microsoft Anti Virus) that is provided with MS-DOS 6 and 6.20 and IBM's AntiVirus® that is provided with IBM-DOS® 6.10. There are many AV programs on the market, e.g. CPAV® commercially available from Central Point, U.S.A. and NAV® commercially available from Symantec, U.S.A. Known shareware products serving the same purpose are VIRUSCAN® commercially available from McAfee Associates and F-Prot® commercially available from Frisk Software in Iceland.

Existing anti-viral software usually perform two functions: (a) virus prevention by avoiding the execution of an infected program, and (b) the scanning of programs and data so as to delete a known virus appended thereto, and in the case of a match, removing the virus from the programs.

By definition, hitherto known anti-viral programs cannot counter a virus whose characteristics are unknown to them (i.e. the program has no pre-stored data which identifies this particular virus) and consequently they always lag behind the threat. Furthermore, there exist heavily encrypted viruses that cannot be removed at all by anti viral software. Such is the case of viruses written by "mutation engines".

There have also been some attempts made to develop hardware solutions to the virus problem. However, hardware anti-viral means never reached maturity.

The efficiency of any hitherto known viral software depends upon constant updating, and even then, it is never up to date, because the pool of new computer viruses steadily increases.

It is thus the object of an present invention to substantially reduce or overcome the drawbacks associated with hitherto known computer virus counter measure means by providing a novel computer-implemented protection method against infection by computer viruses, thereby hindering the infection of a candidate program by a virus, regardless of whether the virus is known, unknown, plain or encrypted.

It is another object of the present invention to provide an anti-virus solution which avoids the necessity of constant updating as new viruses are circulated.

GENERAL DESCRIPTION OF THE INVENTION

Regardless of the operating system under consideration, the term "output", when used in connection with "open file" or "create file" commands, signifies a particular status of the file which allows writing or modifying data in the file. "Output" in this connection does not necessarily imply that data is actually written or modified in the file.

The invention herein provides a computer-implemented method, executable in a data processing means, that is applied to a storage medium so as to render it immunized to infection by computer viruses of computer programs stored thereon.

The present invention is based on the realization that a computer virus is a real computer executable code, which requires available space to write its own code on the storage medium, and which, as a rule, cannot exploit an already allocated space in the storage medium. The latter characteristic stems, as specified in the foregoing, from the computer virus inherent property to append itself to (or in some cases prepend) already existing files rather than overwriting existing files.

By applying the protection computer-implemented process of the invention, the storage medium is rendered immunized against computer virus infections, hereinafter "immunized storage medium", so that a virus trying to infect a program, stored in the immunized storage medium, will find no room to write its own code, thereby preventing it from infecting computer files and, obviously, disabling the destructive consequences thereof.

After the programs to be protected are copied to the storage medium, the computer-implemented process, according to the embodiment of the invention, is applied as follows:

(a) the size S of the free space left in the storage medium is determined;

(b) an empty file is generated and opened for output; this operation automatically results in the generation of a file pointer, pointing to a "file start location";

(c) the pointer is moved to a file location having an offset with respect to the file start location, which corresponds to the so obtained size S. Typically, if these are S free bytes, and the file start location is at index 0, then the pointer is moved by S-1 bytes.

(d) Next, an arbitrary value is written to the current file location in a single "write" command, and the file is closed thereby changing the status of the free storage space to seemingly "occupied", albeit that it has not actually been written upon. In some cases the single "write" command may be skipped and accordingly after having moved the pointer to the desired location, the file is closed, giving rise to the elimination of free storage space in the storage medium. It should be appreciated that by altering the status of the free space on the storage medium to "occupied", the computer virus is deprived of its capability to append its code to any of the existing files that are stored in the storage medium.

(e) The file is labeled with a pseudo random designation (label) in order to prevent its identification.

If, on the contrary, the file had been labeled by a constant name, an attacking virus could have easily identified the file and disabled its operation, e.g. by removing the protective shell thereof.

There are known in the art "overwriting deleted files" utilities, such as WIPEDEL.BAT (described in "overwriting deleted files", PC Magazine, volume 12, number 13, July 1993), which are intended for physically overwriting the data that are left after files were deleted (e.g. by invoking a "DEL" command under DOS® operating system, or by a similar file deletion utility). The purpose of the WIPEDEL-.BAT utility is to prevent the possibility of restoring information contained in an erased file. Otherwise, if the WIPEDEL.BAT utility had not been used, the data of the erased files could have been restored, e.g. by invoking the "UNDELETE" utility under DOS®.

The computer implemented process of the invention is well distinguished from the specified WIPEDEL.BAT utility not only in that it is intended for an entirely different purpose, i.e. countering viral computer infection vs. preventing restoration of deleted files, but also in its way of operation. Thus, the computer implemented process of the invention does not perform any writing action onto the free storage space, (or in accordance with an alternative embodiment it performs merely one writing action), regardless of the size of free space, whereas the operation of the WIDEDEL.BAT utility necessitates writing data in each and every byte of the free storage space, an operation that becomes relatively time consuming when large free space is concerned. In summary, the computer controlled process of the invention is well distinguished from the known "overwriting deleted files" utilities, both in terms of "what" it does and in terms of "how" it does it.

There is thus provided in accordance with the invention a computer implemented method for rendering computer files, that are pre-stored on a storage medium, immune to computer virus infection; each of said files is either empty or contains data occupying one or more logically successive data units, and is further associated with an "end-of-file location" marking for respectively marking an empty file or the last data unit of said logically successive data units; the remaining portion of said storage medium, not containing files, being the free space of said storage medium; the computer implemented method comprising the following steps executed in a data processing means:

(i) determining a free space value, expressible in terms of number of data units, standing for the size of said free space;

(ii) opening at least one selected file on said storage medium for output, whereby a file pointer pointing to said selected file is obtained;

(iii) assigning to the file pointer of each one of said at least one selected file, a respective pointer value having a logical offset with respect to said end-of-file location, such that the sum-total of said respective logical offsets substantially equals said free space value; and (iv) closing each one of said at least one selected file;

whereby said free space is associated, substantially in its entirety, to said at least one selected file, leaving no room for storing a computer virus on said storage medium.

It should be noted that the term "logical" used herein denotes that successive data units, may be stored in physically non-consecutive locations on the storing medium, e.g. owing to fragmentation and other known per se phenomena.

Preferably, the size of a data unit is one byte.

Each one of said at least one selected file may be either one of said pre-stored computer files or, alternatively, a newly created file. The latter embodiment necessitates an additional "create file" step before step (ii).

As stipulated in steps (ii)–(iv) above, more than one file may be selected for attaining the desired immunization result, nevertheless, according to a preferred embodiment one selected file is sufficient to accomplish this result. Clearly by this embodiment the pointer associated with the sole selected file is assigned to a value having a logical offset of substantially said free space value, with respect to the end of file.

Thus, preferred embodiment steps (ii)–(iv) are replaced by the following computer implemented method steps (ii).A–(iv).A:

(ii). A opening a selected file on said storage medium for output, whereby a file pointer pointing to said selected file is obtained;

(iii). A assigning to the so obtained file pointer a pointer value having a logical offset of substantially said free space value with respect to the end of file location; and (iv). A closing the selected file;

whereby said free space is associated, substantially in its entirety to said selected file, leaving no room for storing a computer virus on said storage medium.

Preferably, said logical offset is exactly said free space value.

It should be noted that the assignment step may be realized, for example, by conventional "seek file" or "move pointer" commands.

Typically, storage media are organized in storage units. Thus, in the case of the known DOS® operating system such storage units are designated "clusters". A central database, known also as File Allocation Table (FAT), holds a plurality of cells each of which is associated with a distinct cluster of the storage medium. Each cell contains a pointer value (typically two bytes—in a FAT based on 16 bits) that is set to non-zero when its corresponding cluster is allocated to a file, or to zero (NULL) in the event that the cluster under consideration is free, i.e. the cluster is available for storing data.

According to an alternative embodiment of the computer implemented method of the invention, the status of the entire storage space can be altered to seemingly "occupied" by arbitrarily writing a non zero pointer value to any cell that holds a zero value (except for a predetermined "reserved" value such as the value used to indicate a "bad cluster"), thereby changing the status of its corresponding cluster from "free" to "occupied". It should be noted that the manipulation of the clusters in the manner specified is a relatively fast procedure, bearing in mind that the alteration of a pointer value in the FAT requires writing four bytes at most, which results in altering the status of the entire cluster (128 bytes to 8K bytes, depending on the storage medium) to occupied. It is, therefore, clear that the latter embodiment is also well distinguished from the WIPEDEL.BAT utility not only in its purpose but also in that the necessity to write data in each and every free byte is avoided.

There is thus provided in accordance with another aspect of the invention a computer-implemented method for rendering computer files, that are pre-stored on a storage medium, immunized to computer virus infection; said storage medium consists of a plurality of storage units, and is further associated with a database having a respective cell for each storage unit; said cell is assigned with either a first value signifying that its respective storage unit is available, or with a second value signifying that its respective storage unit is occupied; the computer-implemented method comprising the following step executed in data processing means: altering the value of each cell having said first value, to said second value; whereby the status of the entire storage medium is changed to seemingly occupied leaving no room for storing a computer virus on said storage medium.

In accordance with a specific embodiment said first value is zero or NULL, and said second value is non-zero signifying the physical address of the cluster on said storage medium.

The computer implemented method of the invention constitutes a significant advantage over hitherto known AV solutions, inter alia, in the following aspects:

(a) The computer implemented method of the invention is insensitive to the attacking virus kind. The computer virus may be new, common, stealth, encrypted, polymorphic or plain. The protection is effective just the same.

(b) Once the storage media has been processed by the method of the invention, the files stored therein are inherently protected without requiring any further action. There is no need to "activate" anything, the protection is in place by its pure existence.

(c) Unlike some of the hitherto known solutions, the protected files are not modified in any way. The latter characteristic is of particular importance when files containing self integrity verification are subjected to protection. According to the method of the invention, only the storage medium is modified in order to protect the files stored therein, whereas the files themselves remain unmodified.

An additional feature of the method of the invention is that in duplication of the immunized storage medium the protective characteristics of the original medium will be inherited by the duplicate, as if it was the originally immunized medium. The need to repeat the protection process on the duplicates is, therefore, avoided.

Still further, the invention provides that the storage medium may be any of magnetic or optical storage medium. Said storage medium may be, for example, a conventional 5½" or 3½" diskette.

The protection is conferred to any kind of file regardless of whether it is an executable or a data file.

The method has been actually tested against hundreds of various computer viruses and withstood their attack, providing effective protection to the programs on the subjected storage medium. It is accordingly appreciated that the computer implemented method of the invention fulfilled a long felt need in the field of countering computer virus infection.

There is further provided in accordance with the invention a machine and associated storage medium which contains at least one selected file or a database that was processed by the computer implemented method of the invention in the manner specified.

If desired, the computer implemented method of the invention may be implemented by the construction of a dedicated controller that would locate the read-write heads at the beginning of the FAT and read the data in the FAT area. A non-zero value is then written in each location where two zero values are found in the sequence, in the manner specified.

For a better understanding the invention will now be described, by way of example only, with reference to the accompanying drawings.

DESCRIPTION OF A SPECIFIC EMBODIMENT

Figure 1:
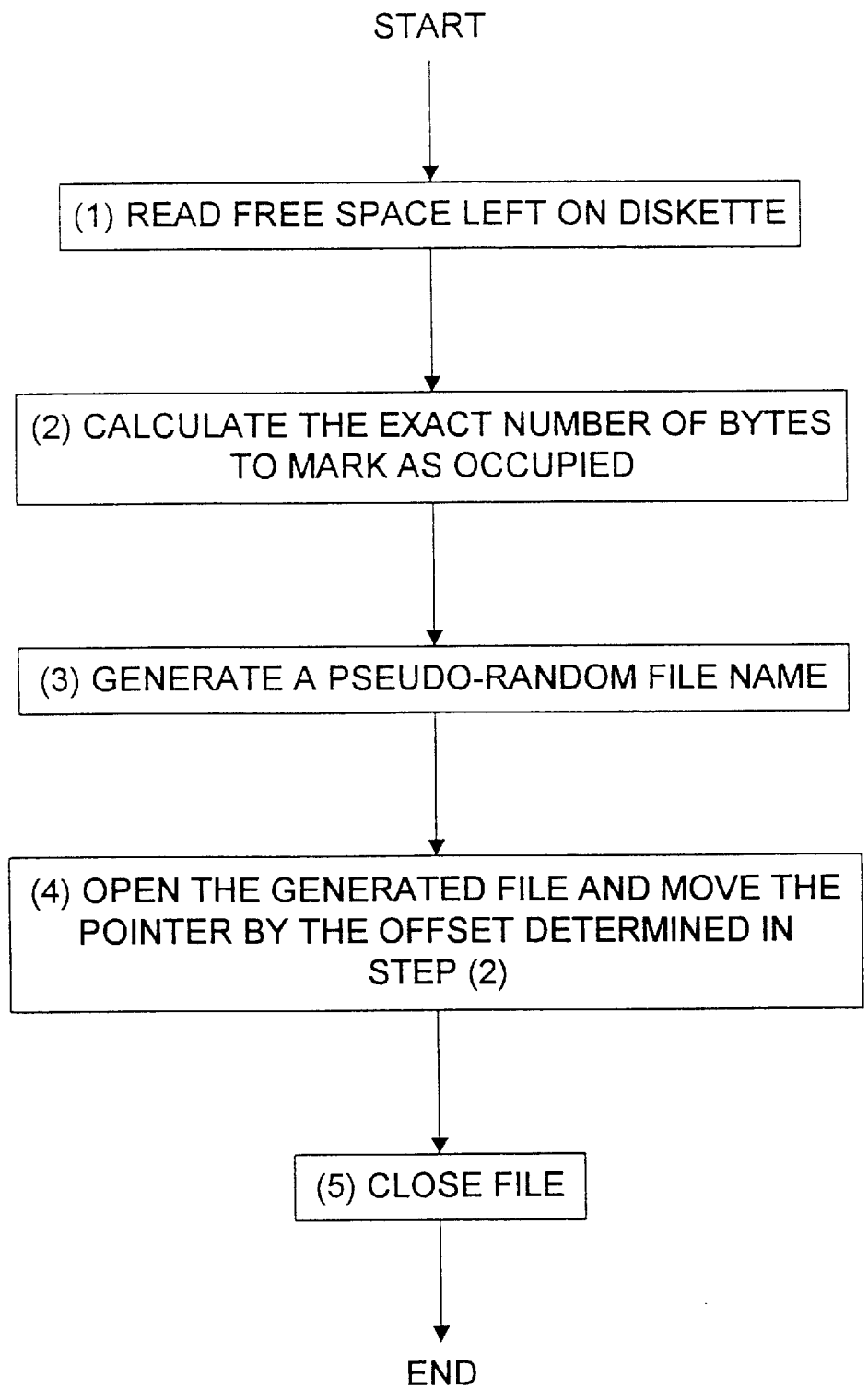
FIG. 1 is a flow chart exemplifying the operation of a computer-implemented method, according to one embodiment of the invention.

Attention is directed to FIG. 1, showing an implementation of the present computer implemented method for the protection of files stored on a magnetic floppy diskette, e.g. in a DOS® 3½" floppy diskette, having a maximum available space of 1.44 megabyte, according to one embodiment of of the invention.

The diskette prepared as described should be duplicated for testing and comparison.

Once the diskette is inserted in a floppy disk drive of a personal computer (P.C.), a suitable computer program may be invoked executing the following steps:

1. Read the free space left on the diskette. This can be done by issuing DOS® internal functions which deliver the free space available on the storage medium, e.g. by DOS® interrupt number 21h (h for Hexadecimal), or with Turbo Pascal function "DiskFree"—both of which return essentially the free space on the specified drive. The term "essentially" indicates that the returned value is an integer multiplication of cluster size, i.e. freespace—(freespace MODULO clustersize).
2. Generate a pseudo random file name, valid under DOS, e.g. "123ABCYZ.$#@". There are known in the art many techniques for attaining this goal such as executing a function whose output value is the sought pseudo random designation, and which receives as an input the elapsed time, where the latter is retrieved from the computer real-time clock chip, which forms part of the P.C. hardware, by using known per se, DOS operating system services.
3. "Open" file 123ABCYZ.$#@ on the floppy diskette for "output", thereby obtaining a file pointer having an initial value which indicates the location of the first byte in the file. It should be noted that the step of opening the file, which in the case of new files includes an implicit "create file" command, results in the generation of structure, far more complex than a simple pointer. Typically, the structure consists of a plurality of fields of which only the pointer to the file is utilized for the realization of the computer-implemented method of the invention. The term "file pointer" is used in the description and appended claims in the simple sense, i.e. data element that indicates the location of a given data unit (e.g. byte) in the file. If more complex addressing schemes are employed (e.g. indirect addressing schemes wherein a pointer holds a value of another pointer which in turn indicates the location of a given data element), the term "pointer" should be construed as one that finally points to the location of data element (or unit) in the file. Reverting now to step 3, and having opened the file, the pointer is moved to a location having an offset equal to the value obtained in step 1.
4. "Close" the file when done. The files stored in the floppy diskette are now rendered immunized against virus infection, simply since a computer virus has no room to append its code to the files stored in the storage medium. Thus, the DIR command, with respect to the located storage medium results in displaying the message "0 free bytes".

Should the programs on the immunized diskette be subjected to attack by a file's virus, for example "Frodo" (alias 100 Years, 4096, Stealth), none of the programs on the protected floppy will be infected. Conversely, every program that is executed on a corresponding non-protected floppy, will be infected by "Frodo".

As specified in the foregoing, the computer-controlled method of the invention may, of course, be utilized also with respect to existing non empty files and in this case the offset is calculated with respect to the end-of-file location indicating the last stored byte in the file. Under DOS, the end-of-file location is automatically derived by the operating system from a "file size" value that is stored in the directory.

Figure 2:
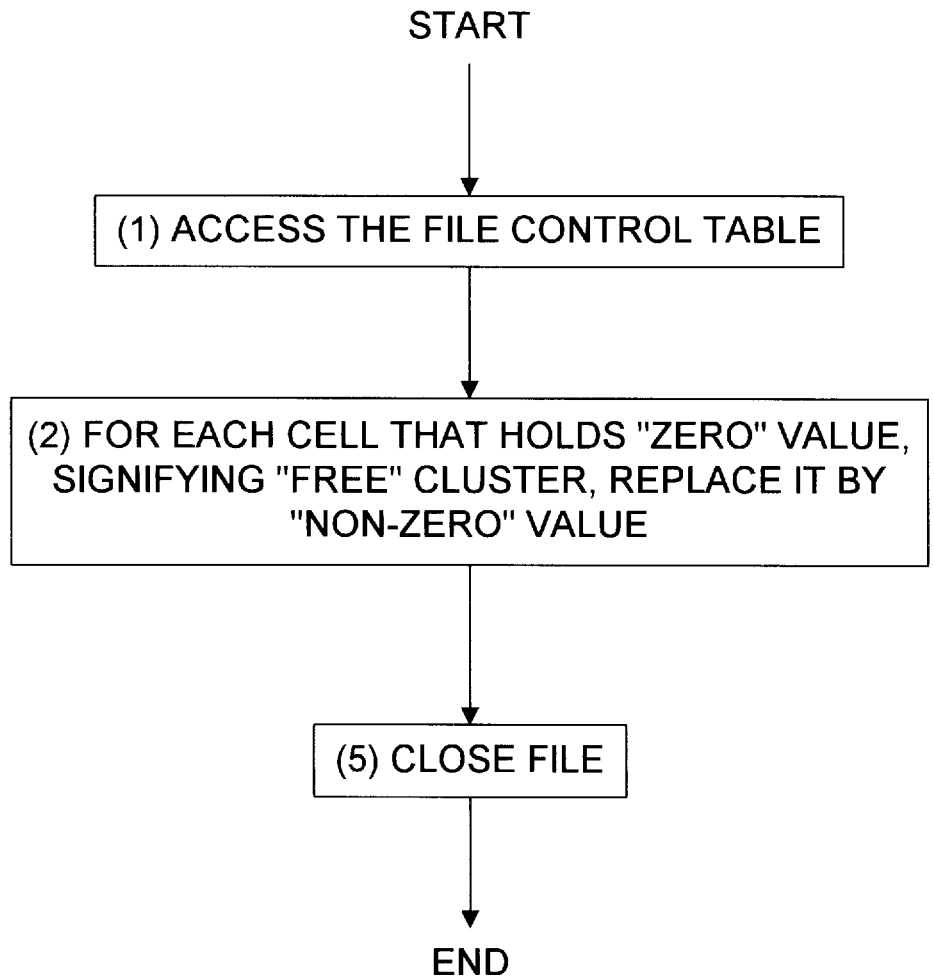
FIG. 2 is a flow chart exemplifying the operation of a computer-implemented method, according to a second embodiment of the invention.

The computer-controlled process according to the second aspect of the invention will now be described by way of example only, with reference to FIG. 2.

Generally speaking, storage media under DOS are organized in storage units named "clusters". Each cluster is represented in the FAT by a cell, containing a value named a "pointer", typically of 12 or 16 bits long. A cluster occupied by a file will have its corresponding pointer in the FAT set to a value that differs from zero. The last cell in the FAT belonging to a given file is set to point to NIL (zero), indicating the end of file. Therefore, a single zero pointer, followed by a non-zero pointer indicates the end-of-file (EOF) of an allocated unit. A zero pointer preceded by another zero pointer indicates a non-allocated cluster, i.e. a cluster that is vacant and is available for storing data. One way to virtually fill the storage medium is by writing an arbitrary, non-zero value into every cell in the FAT, that is not yet allocated.

A storage medium, when processed as described above, will have no free space left for the further storage of additional data. The actual implementation is feasible by either hardware, or by software running under a data processing device.

The implementation of the computer-implemented method of the invention on magnetic storage medium such as, but not only floppy disks, consists in the intervention at the FAT level by the physical replacement of every two adjacent pairs of zeros by a couple of bytes having non-zero values. In a manner similar to the first aspect of the invention, the process should be applied after the files to be protected were written onto the storage medium.

Thus, for example, assuming the following hexadecimal sequence is found in the FAT:

11 12 13 AA BB CC 00 00 00 DD EE 14 15

After processing, the sequence will be replaced by:

11 12 13 AA BB CC 00 XX XX DD EE 14 15 where "XX" denoted an arbitrary non-zero value (except for reserved values) and the non replaced "00" stands for EOF of a file. Note that undoing the protection process is straightforward, under DOS, that is, in order to restore the original status of the clusters, the storage medium is inspected with the CHKDSK command, that will reveal many "lost allocation units". In fact, the process according to the invention converts every non-allocated cluster to a "lost cluster". In order to restore the original status of the storage medium, i.e., freeing of the space used by these lost clusters, a CHKDSK/F command is invoked and answering "no" when prompted by DOS with the message "convert lost clusters to file?"

Note that the implementation as in the example above, will not appear in the directory of the floppy, or disk. There are no files attached to the clusters allocated by the present process, and the protection cannot be removed by the DELETE or ERASE command.

As specified in the foregoing, the method of the invention may be realized by utilizing a dedicated controller.

Figure 3:
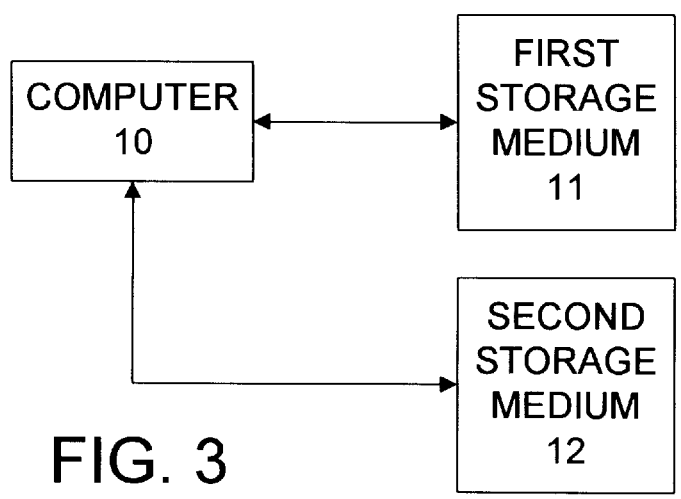
FIG. 3 is a block diagram of a machine according to the present invention.

FIG. 3 shows a machine for implementing the invention including a computer 10, a first storage medium 11 and a second storage medium 12 in which is produced a duplication of a selected file, a database or the first storage medium according to the method described above.

The invention has been described with a certain degree of particularity, but it should be understood that various alterations and modifications may be made without departing from the spirit or scope of the invention as hereinafter claimed. Thus, for example, whereas, for sake of convenience the description focused merely in the DOS® operating system, it applies, mutatis mutandis, also to other operating systems.

I claim:

1. A computer implemented method of protecting computer files that are pre-stored on a storage medium, against computer virus infection; each of said files being either empty or containing data occupying one or more logically successive data units, and being further associated with an end-of-file (EOF) location marking on the storage medium for respectively marking an empty file or the last data unit of said logically successive data units; the remaining portion of said storage medium, not containing files, defining free space on said storage medium; the method being carried out in data processing means after coupling the storage medium to the data processing means, the data processing means being configured according to a given operating system for reading data from and writing data to the storage medium, the method comprising the steps of:

(i) determining a free space value, expressible in terms of number of data units, corresponding to the size of said free space on the storage medium;

(ii) selecting at least one file on said storage medium, opening the file for output, and obtaining a file pointer pointing to a location of said selected file on the storage medium;

(iii) assigning to the file pointer obtained for each selected file, a pointer value having a respective logical offset with respect to said end-of-file location, such that a sum-total of the respective logical offsets assigned for each selected file substantially equals said free space value; and included in each respective pointer value substantially equals said free space value; and (iv) closing each selected file;

whereby the free space on the storage medium is associated, substantially in its entirety to said at least one file, leaving no apparent room on the storage medium for storing a computer virus and preventing external writing on the storage medium by a computer virus.

2. The computer implemented method according to claim 1, wherein said at least one selected file is from the group comprising said pre-stored computer files or a newly created file.

3. The computer implemented method according to claim 1 wherein said logical offset sum-total is exactly said free space value.

4. The computer implemented method according to claim 1, wherein said assignment step is realized by seek file or move pointer commands.

5. The computer implemented method according to claim 1, wherein the selected file is either an executable or a data file.

6. The computer implemented method according to claim 1, wherein said steps are implemented by a dedicated controller.

7. The computer implemented method according to claim 1, wherein the size of a data unit is one byte.

8. The computer implemented method according to claim 1, executable by said data processing means under DOS® operating system.

9. The computer implemented method according to claim 1, wherein a selected file is labeled by a pseudo random designation.

10. The computer implemented method according to claim 1, including replacing said steps (ii)–(iv) with the following computer implemented method steps (ii).A–(iv).A:

(ii). A selecting a file on said storage medium for output, and obtaining a file pointer pointing to a location of said selected file on the storage medium;

(iii). A assigning to the so obtained file pointer a pointer value having a logical offset of substantially said free space value with respect to the end of file location; and (iv). A closing the selected file;

whereby the free space on the storage medium is associated substantially in its entirety to said selected file, leaving no apparent room on the storage medium for storing a computer virus.

11. The computer implemented method according to claim 10, wherein said selected file is either said pre-stored computer file or a newly created file.

12. The computer implemented method according to claim 10, wherein said assigning step is realized by seek file or move pointer commands.

13. The computer implemented method according to claim 10, wherein said steps are implemented by a dedicated controller.

14. The computer implemented method according to claim 10, executable by said data processing means under DOS® operating system.

15. The computer implemented method according to claim 10, wherein said selected file is labeled by a pseudo random designation.

16. A machine having an associated first storage medium which contains at least one selected file processed by the computer implemented method according to any one of claims 1 to 15.

17. A machine having an associated second storage medium that is produced by duplicating the processed selected file of claim 16.

18. A machine having an associated second storage medium that is produced by duplicating a copy of said first storage medium of claim 16.

19. The computer implemented method of claim 10, wherein the storage medium is either a magnetic or an optical storage medium.

20. The computer implemented method according to claim 1, wherein the storage medium is either a magnetic or an optical storage medium.

21. A computer-implemented method of protecting computer files that are pre-stored on a storage medium, against a computer virus infection; said storage medium including a plurality of storage units, and being associated with a database having a plurality of cells each corresponding to at least one of said storage units; each one of said cells being assigned with either a first value signifying that at least one corresponding storage unit is available, or with a second value signifying that at least one corresponding storage unit is occupied; the method being carried out in data processing means and comprising the steps of;

configuring the data processing means according to a given operating system for reading data from and writing data to the storage medium;

coupling the storage medium to the data processing means; and altering the value of each database cell having said first value signifying that a corresponding storage unit of the storage medium is available, to said second value signifying that said at least one corresponding storage unit of the storage medium is occupied;

thereby changing the status of the entire storage medium to a seemingly occupied state, and leaving no apparent room for storing a computer virus on said storage medium to prevent external writing on the storage medium by a computer virus.

22. The computer implemented method according to claim 21, wherein said steps are implemented by a dedicated controller.

23. The computer implemented method according to claim 21, executable by said data processing means under DOS® operating system.

24. The computer implemented method according to claim 23, wherein said database is a file allocation table (FAT), and wherein said storage unit is a cluster.

25. A machine having an associated first storage medium which contains at least one database processed by the computer implemented method of any of claims 21 to 24.

26. A machine having an associated second storage medium that is produced by duplicating the processed database of claim 25.

27. A machine having an associated second storage medium that is produced by duplicating a copy of the first storage medium of claim 25.

* * * * *